United States Patent [19]

Lancaster et al.

[11] Patent Number: 4,750,189

[45] Date of Patent: Jun. 7, 1988

[54] DUCTED FLOW LEAK DETECTION

[75] Inventors: David H. Lancaster; William R. Bostock, both of Woodford, United Kingdom

[73] Assignee: British Aerospace Public Limited Co., London, England

[21] Appl. No.: 945,620

[22] Filed: Dec. 23, 1986

[30] Foreign Application Priority Data

Dec. 23, 1985 [GB] United Kingdom ................. 8531670

[51] Int. Cl.[4] ............................................ G01M 3/00

[52] U.S. Cl. ........................................................ 374/4

[58] Field of Search .................... 374/4; 73/46, 40.5 R

[56] References Cited

U.S. PATENT DOCUMENTS

| | | | |
|---|---|---|---|
| 4,259,861 | 4/1981 | Yamamoto et al. | 374/4 |
| 4,534,662 | 8/1985 | Barlian | 374/4 |

FOREIGN PATENT DOCUMENTS

| | | | |
|---|---|---|---|
| 0060552 | 3/1982 | European Pat. Off. . | |
| 1525646 | 10/1966 | Fed. Rep. of Germany . | |
| 2236914 | 3/1973 | Fed. Rep. of Germany | 374/4 |
| 3138355 | 4/1983 | Fed. Rep. of Germany . | |
| 3213821 | 10/1983 | Fed. Rep. of Germany . | |
| 3246227 | 6/1984 | Fed. Rep. of Germany . | |
| 55163400 | 6/1954 | Japan . | |
| 1145295 | 3/1969 | United Kingdom . | |

*Primary Examiner*—Stewart J. Levy

*Assistant Examiner*—Joseph W. Roskos

*Attorney, Agent, or Firm*—Cushman, Darby & Cushman

[57] ABSTRACT

An arrangement for detecting and isolating leaks in a high temperature ducted flow system in which the fluid flow ducts are contained within duct insulation means which define an insulating air space around the ducts. The arrangement is configured such that in the event of a fractured or leaking duct, the leaking flow is contained within the insulating air space and constrained to flow to one pre-determined end of the duct system where it is ejected through a fluid outlet opening positioned in close proximity to leak sensing means. By this arrangement the leakage flow is cause to impinge on the leak sensing means enabling the leaking system to be effectively isolated.

9 Claims, 4 Drawing Sheets

DUCTED FLOW LEAK DETECTION

This invention relates to ducted flow leak detection systems. More particularly it relates to an arrangement for detecting and isolating leaks in an aircraft air conditioning system.

It is known, in connection with ducted systems carrying high temperature air, for example, to provide means for detecting the presence of leakages within such systems which may be inadvertently caused by a number of factors. The temperature of the air passing through the ducts may be of a high order. For example, the system may be drawing hot air as 'bleed' flow from the aircraft engines at a temperature in the region of 250° C. In the event that a leak develops, for whatever reason, in a duct wall or in a mechanical joint between adjacent duct portions, the resulting loss of fluid may be detrimental. This may impair the effectiveness of the air conditioning system throughout the aircraft, or, perhaps more importantly, since duct systems in aircraft frequently lie closely adjacent to other systems or load carrying structures, these may be seriously affected by the impingement of hot air upon them or its mere circulation in close proximity.

One known means of leak detection is by the use of sensing wires able to detect an increase in localised temperature and, when a pre-determined temperature is exceeded, initiate a shut-off sequence, thus isolating the flow in that part of the system in which the leak occurs. The wire, which is available in a range of pre-set operating temperatures is located to run along the path of the ducts on adjacent structure but not too close such that its setting temperature is exceeded. The selected setting temperature of these discrete sensing wires must be approximately mid-range between the inside temperature of the duct and the maximum ambient temperature of the duct surrounding. However, as a result of these parameters it may be difficult to detect a leak if the differential temperature from inside to outside is very small; this situation occurs at the joints. Furthermore, the leak may occur in a position within the duct remote from the location of the sensing wire.

It would therefore be beneficial, and is the object of the present invention to overcome these shortcomings by means in which the leakage flow issuing from a fractured or leaking duct is effected in such a manner that a high temperature differential is attained and directionally controlled such as to ensure impingement upon the sensing wire.

According to the present invention, there is provided an arrangement for detecting and isolating leaks in a high temperature ducted fluid flow system said arrangement including:

duct means through which fluid flow can take place, coupling means interconnecting at least two duct means located substantially end to end, duct insulation means extending over substantially the greater lengthwise portion of said duct means and disposed about said duct means to define an insulating air space and leak containment means, blanking means located at each termination of said duct insulation means to close-off said insulating air space, one of said blanking means including fluid venting means in communication with leak directing means said leak directing means including fluid outlet means positioned adjacently to leak sensing and isolating means, the arrangement being such that if a fluid leak occurs in said duct means, said leakage flow will be contained within the insulating air space and constrained to flow through said fluid venting means in said blanking means into the space encompassed by said leak directing means and ejected through said fluid outlet means such that it impinges directly upon leak sensing and system isolating means.

One embodiment of the present invention will now be described, by way of example, with reference to the accompanying drawings in which, FIG. 1, illustrates an air-conditioning duct mounted on the front spar of an aircraft wing.

Figure 1:
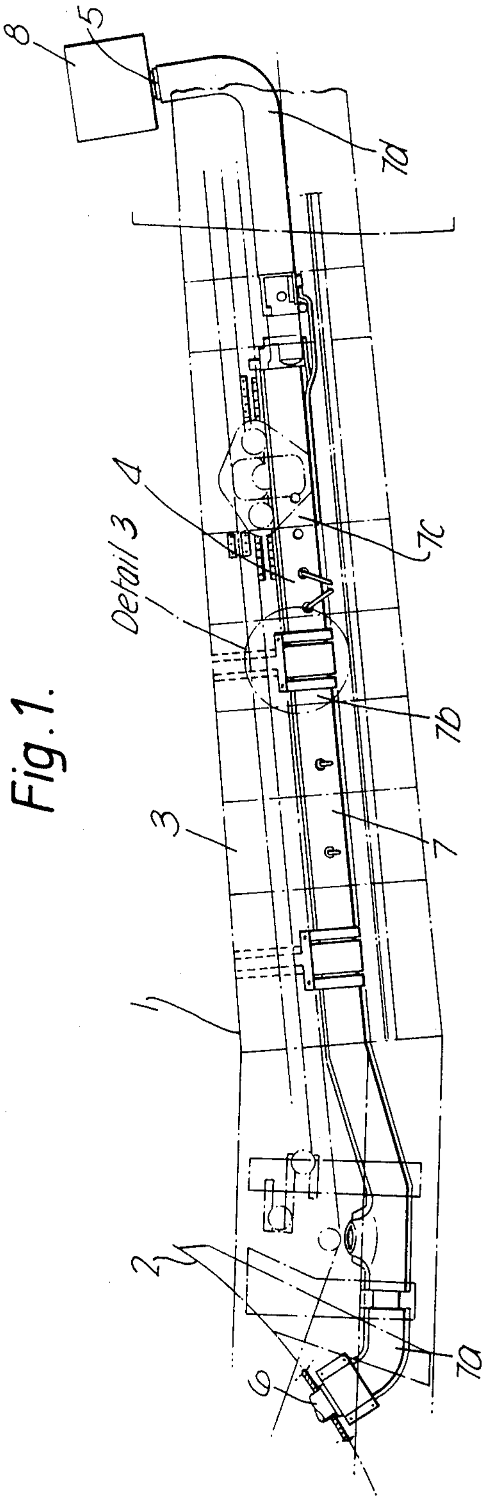

Referring to the drawings, FIG. 1 illustrates an aircraft arrangement including a fuselage 2, the partial span of an aircraft wing 1 viewed on the front face of a wing front spar 3. An air-conditioning duct assembly 4 extends inboard from the engine 'bleed' air inlet opening 5 and passes into the fuselage 2 at 6 where it communicates with the aircraft air-conditioning system (not shown). The air-conditioning duct assembly 7 includes interconnected duct portions *7a, 7b, 7c, 7d* respectively through which a supply of air is 'bled' or tapped from the aircraft engine supply source 8 at a temperature substantially 250° C.

Figure 2:
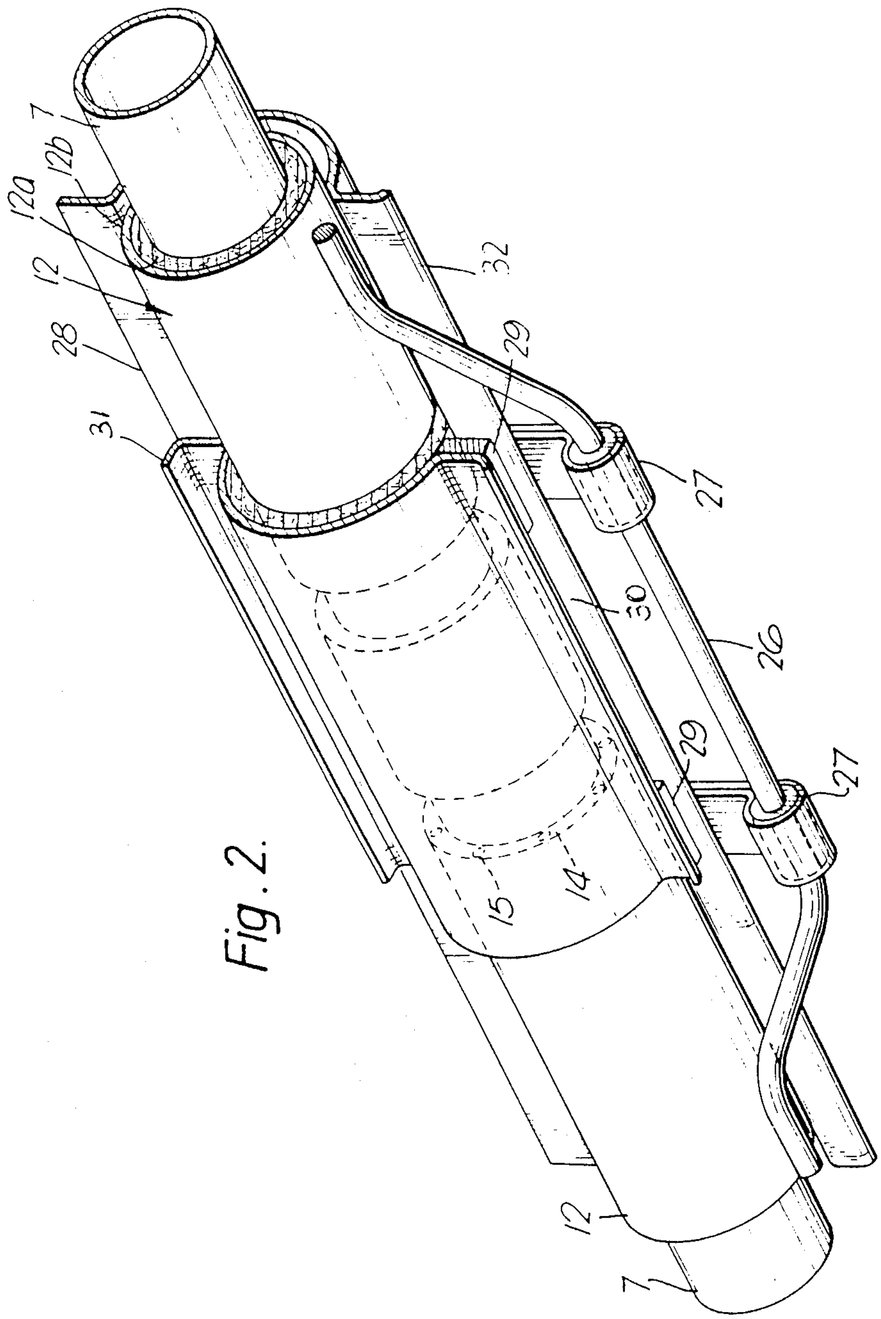
FIG. 2, is a pictorial arrangement of a duct joint assembly in accordance with the invention.
Figure 3:
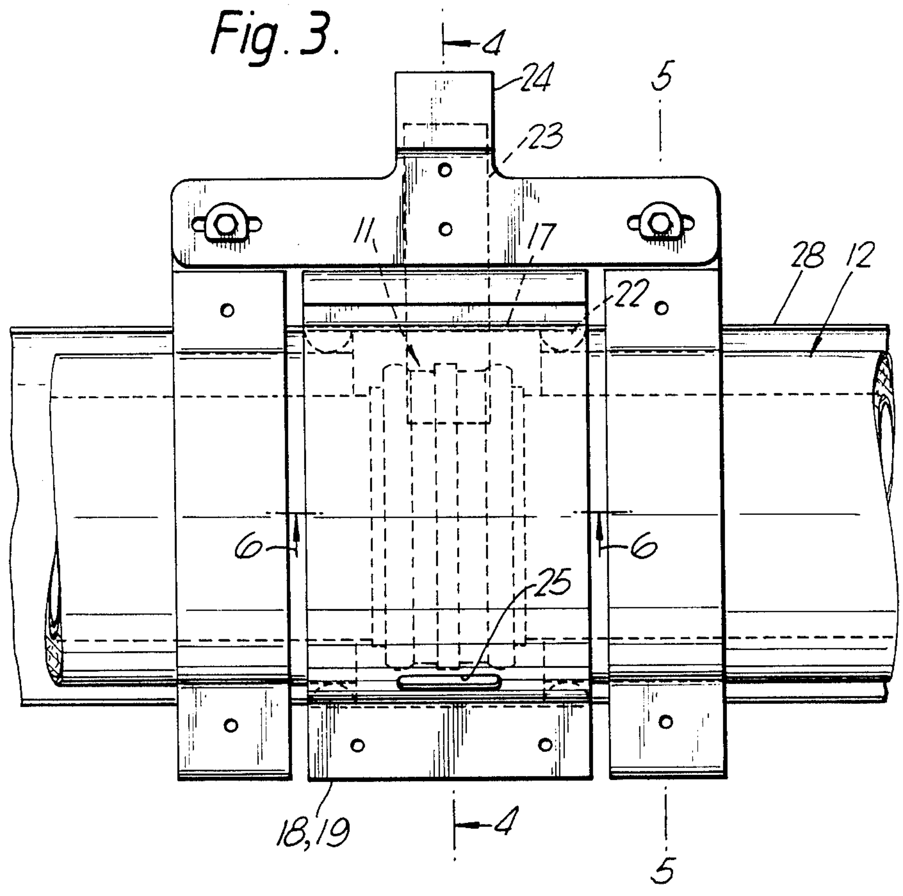
FIG. 3, shows a front elevation on a typical duct joint assembly in accordance with the invention where indicated at 'Detail 3' in FIG. 1.
Figure 6:
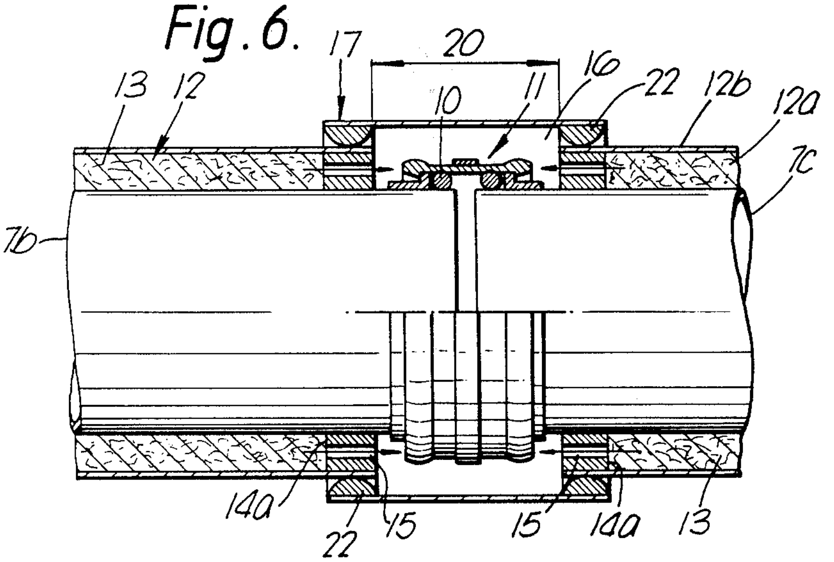
FIG. 6, is a transverse section through the same joint assembly about a line 6—6 in FIG. 3.
Figure 4:
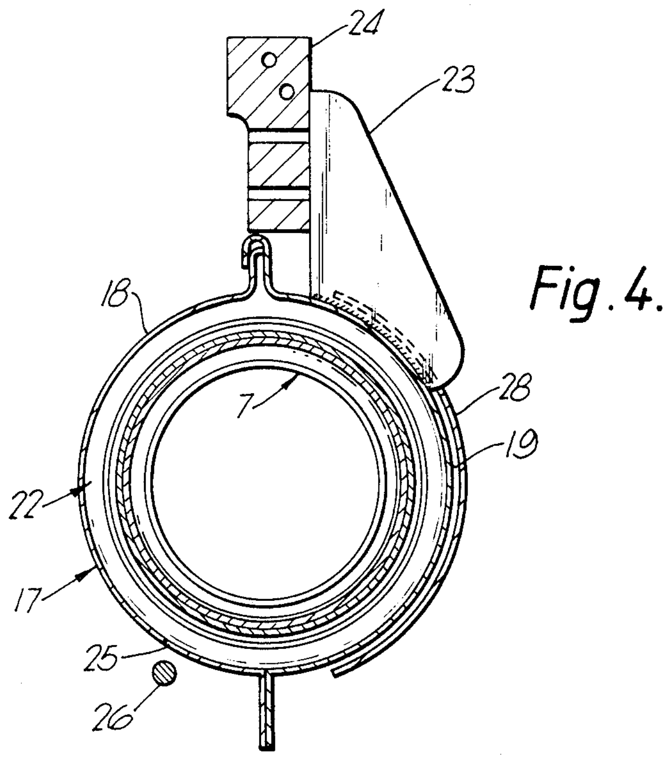
FIG. 4, is a vertical section through the typical joint assembly about a line 4—4 in FIG. 3.
Figure 5:
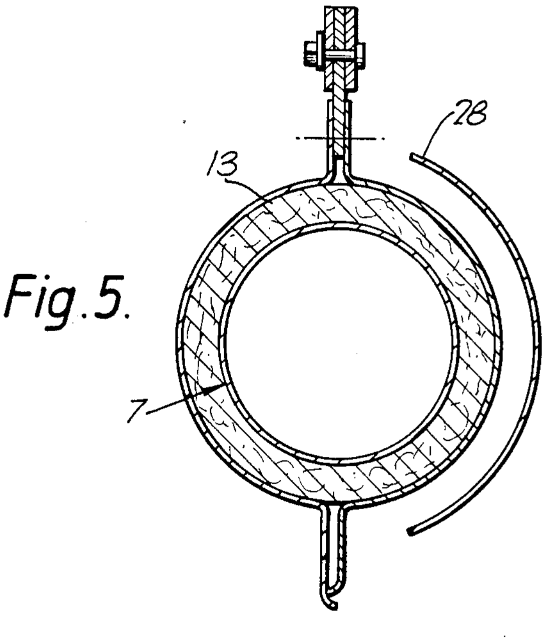
FIG. 5, is a further vertical section through the same joint assembly about a line 5—5 in FIG. 3.

Interconnection between adjoining duct portions, for example *7b* and *7c* is illustrated in FIG. 6, each duct termination configured to include annular pipe coupling 11 shown in partial section here. It is common practice to contain each duct portion in concentric insulating lagging 12 of greater diameter than that of the duct to give an insulating air space 13 but terminating a short distance from each duct end to allow adequate clearance for coupling adjacent duct portions. Although for purposes of insulation the duct lagging need only be of a suitable material having the required insulating properties, in the present invention the material selected is one which will additionally have properties capable of withstanding pressure in the event of a duct fracture, for example a lagging material of glass-fibre wool *12a* with an outer wrapper of stainless steel *12b*, 0.006" or 0.008" thick. This ensures that the leaking high temperature air flow will be constrained within the lagging 12 and to flow in a controlled manner lengthwise towards one end. This is achieved as illustrated by particular reference to FIG. 2 and FIG. 6 which shows that the insulating air space 13 is blanked off by means of blanking pieces 14 at the termination of the lagging 12, the blanking piece 14a at one end incorporating a number of fluid venting holes 15 through which the air flow passes into leak directing apparatus 16. The leak directing apparatus 16 includes a concentric metallic muff 17 preferably comprising a pair of flanged semi-circular muff portions 18 and 19 of a length exceeding the distance 20 between adjacent lagging portions and including annular sealing rings 22, sealingly engaging the lagging portions 12. As illustrated in FIG. 4, the semi-circular portion 19 of the muff 17 includes a welded attachment bracket 23 which provides a suitable bolted attachment 24 to the aircraft structure. The semi-circular muff portion 18 includes a longitudinal fluid outlet slot 25. In FIG. 2 an alternative arrangement is illustrated diagrammatically particularly showing that the fluid outlet slot is positioned such that it aligns with the sensing wire 26 located to the apparatus 16 by P-clips 27 and that alignment applies equally to the embodiment of FIG. 3 but is omitted for reasons of clarity. However, the slot 30 in the FIG. 2 arrangement, although corresponding in function to the slot 25, in the FIG. 3 arrangement arises as a consequence of assembly and not physical formation by slotting or punching. In the arrangement of FIG. 2 the muff portion 31 does not attach to a corresponding muff portion as in the arrangement of FIG. 3 but to a longitudinal heat shield 28 located to the wing structure behind the duct, the lower flange 32 of this heat shield together with that of the muff portion 31 spaced apart by means of spacing packings 29 which determine the slot 30. With reference to FIG. 3 and FIG. 5 in the preferred arrangement the heat shield 28 is quite independent of the duct arrangement but occurs in structurally sensitive areas such as the wing front spar.

The sensing wire 26, although only depicted locally, runs along the path of the ducts on adjacent structure but not too close to the duct such that its setting temperature is exceeded. The significance of the present invention is in the location of the sensing wire 26 relative to the slot 25 or 30 such that leak flow passing into leak direction apparatus 16 will impinge directly on the sensing wire when it subsequently passes through the slot 25.

In addition to sensing a leak resulting from an actual duct failure, the apparatus, by encompassing a duct to duct joint may advantageously also detect any inadvertent leakage from the joint such as may be due to a faulty seal 10 in coupling 11.

Finally, by virtue of its containment within the system, the flow issuing from the slot 25 will ensure the desired temperature differential for the discrete sensing wires and positively initiate isolation of the faulty system.

We claim:

1. An arrangement for detecting and isolating leaks in a high temperature ducted fluid flow system said arrangement including:

duct means through which fluid flow can take place, coupling means interconnecting at least two duct means located substantially end to end, duct insulation means extending over substantially the greater lengthwise portion of said duct means and disposed about said duct means to define an insulating air space and leak containment means, blanking means located at each termination of said duct insulation means to close-off said insulating air space, one of said blanking means including fluid venting means in communication with leak directing means, said leak directing means including fluid outlet means positioned adjacently to leak sensing and system isolating means, the arrangement being such that if a fluid leak occurs in said duct means, said leakage flow will be contained within the insulating air space and constrained to flow through said fluid venting means in said blanking means into the space encompassed by said leak directing means and ejected through said fluid outlet means such that it impinges directly upon said leak sensing and system isolating means.

2. An arrangement according to claim 1 in which said leak directing means is disposed about said duct coupling means and extends longitudinally to sealingly overlap at least the termination of said duct insulation means.

3. An arrangement according to claim 1 in which said blanking means including fluid venting means associated with respective interconnected ducts positions are in communication with common leak directing means.

4. An arrangement according to claim 1 in which said duct insulation means includes an inner insulating layer of glass-fibre wool and an outer metallic wrapping layer of stainless steel.

5. An arrangement according to claim 1 in which said leak directing means comprises a pair of flanged semi-circular muff portions fixedly located to each other and includes sealing means to concentrically encompass and sealingly overlap at least the termination of said adjacent duct insulation means.

6. An arrangement according to claim 5 in which at least one of said semi-circular muff portions includes fluid outlet orifice means.

7. An arrangement according to claim 1 in which said leak directing means comprises a first heat shield portion extending longitudinally between said duct means and adjacent heat sensitive support structure and a second semi-circular muff portion fixedly located to it including sealing means and extending over at least the termination of said adjacent duct insulation means.

8. An arrangement according to claim 7 in which said semi-circular muff portion includes upper and lower attachment flanges, said upper attachment flange located along its length by attachment means, said lower attachment flange attached to said first heat shield portion only at its extremities and including packing means interposed between said first and second portions at said lower flange attachment means thereby to define a longitudinal fluid outlet slot between said packings.

9. An arrangement according to claim 1 in which said leak sensing and system isolating means includes a heat sensitive sensing wire extending adjacently the fluid flow duct system and fixedly located in alignment with fluid outlet means in said leak directing means.

* * * * *